United States Patent [19]

Hinterlechner

[11] Patent Number: 5,555,962
[45] Date of Patent: Sep. 17, 1996

[54] DEVICE FOR OVERLOAD PROTECTION AND BRAKING OF A MACHINE PART DRIVEN BY A MOTOR

[75] Inventor: Gerhard Hinterlechner, Pforzheim, Germany

[73] Assignee: Micron Technology, Inc., Boise, Id.

[21] Appl. No.: 211,562

[22] PCT Filed: Jul. 9, 1992

[86] PCT No.: PCT/EP92/01544

§ 371 Date: Jan. 17, 1994

§ 102(e) Date: Jan. 17, 1994

[87] PCT Pub. No.: WO93/01912

PCT Pub. Date: Feb. 4, 1993

[30] Foreign Application Priority Data

Jul. 17, 1991 [DE] Germany ............... 41 23 681.5

[51] Int. Cl.⁶ ............... B60K 41/24; F16D 67/02
[52] U.S. Cl. ............... 192/12 R; 192/48.92; 192/56.54; 192/56.62
[58] Field of Search ............... 192/12 R, 12 B, 192/48.92, 145, 56.53, 56.54, 56.62

[56] References Cited

U.S. PATENT DOCUMENTS

| | | | |
|---|---|---|---|
| 1,613,991 | 1/1927 | Giannattasio | 185/40 R |
| 1,865,129 | 6/1932 | Menhall | 192/18 R |
| 4,022,307 | 5/1977 | Berrie et al. | 192/12 D |

FOREIGN PATENT DOCUMENTS 0205989  12/1986  European Pat. Off. .

*Primary Examiner*—Andrea L. Pitts
*Attorney, Agent, or Firm*—Dvorak and Traub

[57] ABSTRACT

A device for overload protection and for braking a machine part driven by a motor (2), in particular a tool driven by a cam gear in a stamping and/or bending machine, comprises a brake (3), an overload clutch (4) disengaging after exceeding a torque threshold, and a freewheel (6) which, during the braking of the drive shaft (1), blocks in the direction of drive, each being arranged on the drive shaft (1) behind one another in the drive line extending from the motor (2) to the machine part.

5 Claims, 3 Drawing Sheets

DEVICE FOR OVERLOAD PROTECTION AND BRAKING OF A MACHINE PART DRIVEN BY A MOTOR

BACKGROUND OF THE INVENTION

The invention relates to a rapid-response braking device for braking a machine driven part.

One of the problems in high-speed stamping and bending machines consists of preventing or limiting, as far as possible, damage to the tool in the event of an excessive load which is placed on the tool. Thus it is known to use an overload clutch which separates the drive line of the motor from the tool if the scheduled load is exceeded (torque) or, with respect to a slipping clutch, which limits the torque transmitted by the drive shaft. Because of the momentum which the masses behind the overload clutch have, they continue to rotate when the overload clutch responds, even if it completely releases the masses from the motor in the drive line. The problem to be solved therefore consists of braking the continuously moving masses as quickly as possible so as to prevent them from causing any major damage. If a brake is provided between the motor and the overload clutch, the brake may brake and stop the motor, but not the section of the drive line which is released by the overload clutch and which connects with the tool. However, if a brake is provided behind the overload clutch, it is possible to brake the tool until it comes to a standstill and thus prevent damage, provided that the brake is fast enough. Unfortunately, the masses that have to be braked in the drive line behind the overload clutch (tools and gears) are generally larger than the masses which lie in the section of the drive line in front of the overload clutch. A brake provided in the drive line behind the overload clutch must therefore be provided with a respectively strong design, which has an adverse effect on the braking times. The braking time is made up of an excitation time which is characteristic for the design of the respective brake and of the pure braking time for dissipating the kinetic energy. Pneumatic and hydraulic brakes require higher excitation periods for driving valves and for building up the required pressure in the braking device than electromagnetic brakes. However, they can provide large braking moments. Fast control devices such as electromagnetic brakes allow for a very short excitation time of the brake coil, but which provide a longer braking time. A short braking time is of importance in stamping and bending machines, and in particular in machines for trimming and forming the legs of integrated circuits (IC) in which the tool is driven by a cam gear, i.e., the forward and backward movement is determined by a roller which rolls on the cam surface of an eccentric disk. A rotation of the eccentric disk is equivalent to one work cycle of the machine in which the tool is positioned, the position being controlled such that the tool is advanced for processing the workpiece (working stroke) and then retracted (idle stroke), and the workpiece is advanced or removed. It is known from experience that the control of the tool movement requires about half a turn of the eccentric disk. Thus, only half of a turn of the eccentric disk is available for conveying the workpiece, the positioning of the workpiece, the control measurement for ensuring that the tool position is correct and for a possible switch-off of the machine if the workpiece position is incorrect. The extension or shortening of the brake angle thus finds entrance into the cycle time of the machine with a factor of up to 2, i.e., the extension of the brake time causes a considerable extension of the cycle time. In order to obtain high-speed machines it is therefore decisive that the workpiece can be stopped very quickly so as to prevent the destruction of the tool in the event of a wrongly positioned workpiece. Until recently this problem was addressed by improving the efficiency of the brakes, reducing the response times and placing the brake as closely as possible to the position to be protected at the end of the drive line. These measures were implemented so as to provide a reduction of the maximally occurring moment that is caused by the released mass moment of intertia. These attempts, however, are subject to certain limits, because high braking moments are required through larger braking devices whenever high mass moments of inertia are present.

SUMMARY OF THE INVENTION

The main object of the invention is to provide a device for braking a motor drive machine part which can provide a particularly rapid stopping of the drive machine part by intentional braking during malfunctions, and which limits the maximally occurring moment in the event of overload and thus the maximum load peak acting on the tools.

In accordance with the invention there is provided in the drive line between the motor and the driven machine part, a combination of a brake, an overload clutch and a freewheel which runs freely during the driving of the machine part, but which blocks during the braking of the driven machine part. The brake in the drive line is disposed in front of the overload clutch and the freewheel is disposed behind the overload clutch. If the brake is operator initiated or operated by a sensor which reports that a workpiece on which the driven machine part (tool) is to act, is not positioned correctly, the momentum of all moving masses initially acts on the brake and the torque threshold is reached very quickly by the braking process, whereupon the overload clutch responds. At this time, the brake does not have to brake the masses disposed behind the overload clutch for the short period until the blocking of the freewheel occurs. It only has to block a very small mass, so that the brake comes to a standstill very rapidly. The response of the overload clutch does, however, not lead to the situation that the released machine part can continue to move unhindered, because the freewheel now automatically takes effect. After passing its clamping angle, which should be very small, said freewheel blocks and receives the remaining momentum of the driven machine part (tool) that is to be braked. It then passes the momentum into the brake which, because it is now static, dissipates the energy practically instantaneously. The holding momentum of the brake is so high that it is not necessary to put the drive shaft into motion again. Here the blocking direction of the freewheel is equivalent to the driving direction.

If the brakes are not intentionally activated and there is an excessive load in the drive line such that the torque threshold of the overload clutch is exceeded, said freewheel responds. In accordance with the invention this can be used to release the braking device. The braking device can stop the drive shaft very rapidly because the freewheel does not initially block at first and thus the momentum of the moving masses behind the overload clutch are not stopped, but those in front of the overload clutch are caught and that require braking. Therefore it is possible to provide the brake with a relatively compact design, i.e., with a smaller brake coil, thereby additionally contributing to a short braking period. The mass to be braked during this phase is particularly small if a further clutch for decoupling the motor is provided between the brake and the motor. In this case, the brake does not have to also brake the flywheel mass of the motor in the event of a response by the overload clutch. Preferably, said further clutch is provided in the form of a clutch-brake combination, i.e., a component consisting of clutch and brake, which provides a minimum of masses to be braked by using a compact design. Because the mass to be braked by the brake is very small, it comes to a standstill very quickly. The braking of the freewheel also occurs very rapidly. The blocking freewheel collects the remaining momentum of the masses in the drive line behind the overload clutch (tool side) like a buffer and transmits the energy into the already static brake. The holding moment of said brake is so large that the drive shaft does not start to move again.

The braking device in accordance with the invention is particularly suitable for high-speed bending and stamping machines, in particular such machines in which tools are mechanically driven by cam gears and in which the moved masses and the braking moments required for their stopping are not too high.

If a reduction gear is provided between the drive part of the overload clutch and the machine part to be braked or an intermediate cam gear, it has the advantage that the clamping angle of the freewheel which leads to the standstill of the machine part is respectively reduced by the reduction caused by the reduction gear on the side of the machine part. This leads to a very small brake angle of the eccentric disk. Furthermore, the cam gear mass moment of inertia to be braked, with respect to the overload clutch and the brake, is reduced by a factor of two of the reduction. For this reason a gear may be provided, in the preferred embodiment of the invention, between the overload clutch and the brake.

In order to initiate the braking process during the response of the overload clutch in the event of an overload, a sensor is preferably provided for monitoring the relative position of the two halves of the overload clutch and for supplying a brake signal to the braking device as soon as the beginning of the relative movement of the overload clutch halves is observed. This allows response to an overload without virtually any delay and without any substantial increase of the moment exceeding the set response moment of the overload clutch. Thus, a rapid stop can be realized.

Suitable sensors are primarily light activated, which allow observing changes in positions within the magnitude of fractions of millimeters.

It is, however, also possible to use a torque sensor disposed somewhere within the drive line for initiating the braking process in the event of overload, or a power sensor in the driven machine part.

An electromagnetic brake can be used as the brake. The electromagnet of said brake is supplied with a high current for a short period when the brake is initiated. The drive motor is also decoupled if the clutch-brake combination is used, and when it is, it is not necessary to brake the motor.

A preferable alternative embodiment consists of providing a servomotor as the motor for driving the machine part said possibly requiring braking. The servomotor is controlled directly and therefore can be stopped very quickly. Such a servomotor can not only assume the task of driving and braking, so a special brake is no longer required.

A very suitable overload clutch is a positive clutch which disengages when the torque threshold is exceeded. Said positive clutch comprises a part that is non-rotatable towards the drive shaft (drive part) and a part which is rotatably and disengagingly arranged on the drive shaft (disengaging part). Such a positive clutch disengages after reaching a predetermined torque threshold thereby allowing the residual momentum energy contained in the drive shaft behind the positive clutch, which in turn is collected by the blocking freewheel and is transmitted to the brake which, in the meantime, has come to a standstill. Such a positive clutch responds very quickly. Its response threshold is usually determined by a spring with which the two clutch halves are pressed against each other. Preferably, a spring with variable lead rate characteristics is used in the positive clutch. Thus, at the initial response, the torque which can be transmitted by the clutch, drops to a very small residual moment. The use of a spring with varying characteristics contributes to the rapid response of the positive clutch.

Slip clutches, which are commonly used as overload clutches, are less suitable, because they have a slower response and transmit thereafter a higher residual moment.

A freewheel usually comprises two ring surfaces which are relatively moveable towards each other. Pawls are disposed between said surfaces, which allow freewheeling in one direction of rotation and clamp in the other direction of rotation. One of said ring surfaces could be arranged directly on the drive shaft. Preferably, one ring is rigidly attached to the drive shaft and the other is rigidly attached to the disengaging part of the overload clutch. The blocking direction of the freewheel is equivalent to the driving direction.

BRIEF DESCRIPTION OF THE DRAWINGS

The enclosed schematic drawings show an embodiment of the invention.

DETAILED DESCRIPTION OF THE PREFERRED EMBODIMENT

Figure 1:
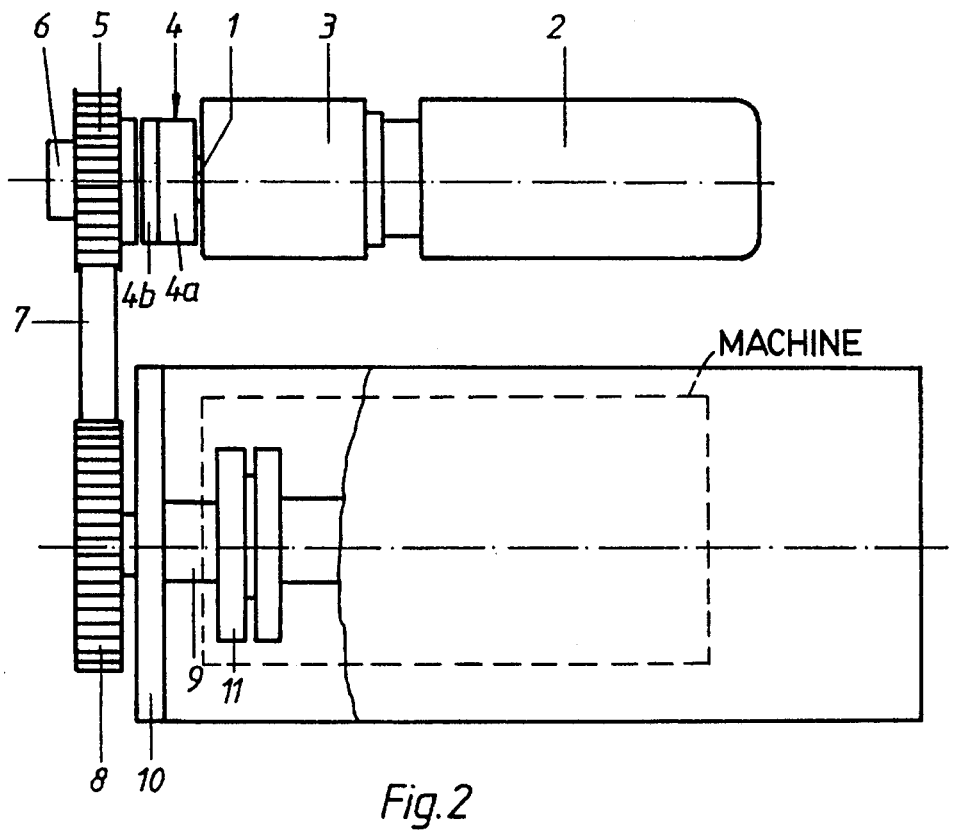
FIG. 1 shows a top view of a drive unit of a machine.

The drive unit comprises on a joint shaft 1 and, disposed behind one another, an electromotor 2, a module 3 comprising an electromagnetic brake and a clutch for decoupling the motor 2, a positive clutch 4 provided as an overload clutch which disengages whenever the torque threshold is exceeded, a toothed wheel 5 and a freewheel 6 (a one-way clutch with a ratchet brake). The driving toothed wheel 5 drives a further toothed wheel 8 by means of a toothed belt 7, which wheel 8 is situated on a driven shaft 9 held in a gear casing 10 and carrying in the gear casing several eccentric disks 11 connected to a drive machine tool 100.

Positive clutch 4 comprises a drive part 4a consisting of a driving collar 12 and a flange 13 and being axially non-displaceable and torsionally rigidly connected with shaft 1. Positive clutch 4 further comprises a disengaging part 4b which encases driving collar 12 in an axially displaceable manner and which is rotatable towards said collar. For this purpose several paraxial bolts 14 are disposed in the disengaging part 4b, which bolts extend into the bores 150 of a bearing ring 15 which is rotatably held on driving collar 12 by means of clutch rollers 16. The bearing ring 15 is torsionally rigidly connected to toothed wheel 5, which wheel is torsionally rigidly connected with the outer ring 6a of the freewheel. The inner ring 6b of the freewheel is torsionally rigidly connected with the drive shaft 1 by means of a wedge 17. Between the outer ring 6a and the inner ring 6b pawls 18 are provided in the freewheel in such a way that the freewheel operates freely while toothed wheel 5 is driven, whereas in the opposite direction pawls 18 block freewheel rotation if shaft 1 is braked and positive clutch 4 is disengaged.

Figures 3, 4, 5:
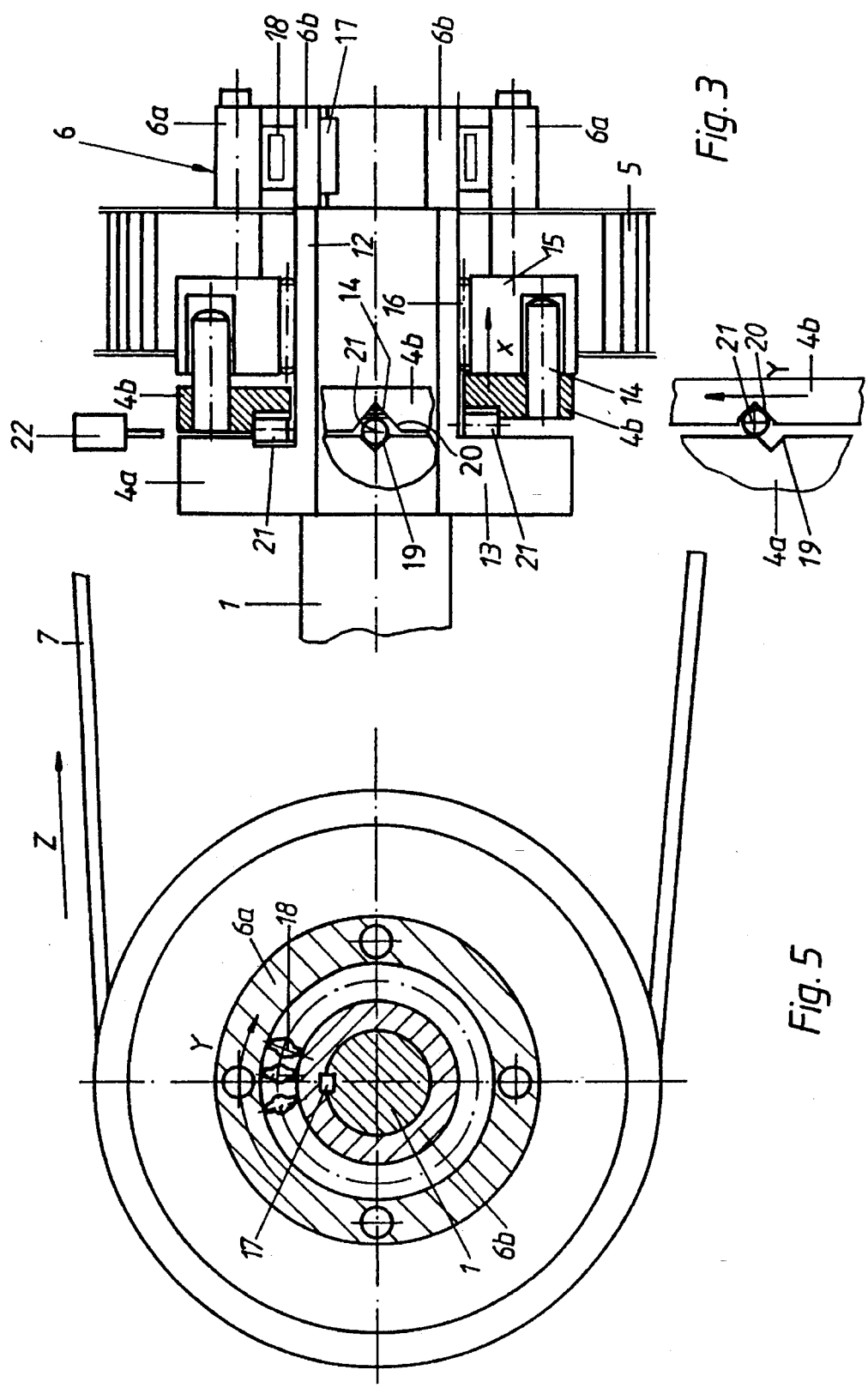
FIG. 3 details a positive clutch in combination with a freewheel clutch as a component of the drive unit represented in FIG. 1.
FIG. 4 shows in detail the positive clutch of FIG. 3 in the disengaged position.
FIG. 5 shows an end view in partial cross section through the freewheel clutch in accordance with FIG. 3.

In the surfaces of the drive part 4a and the disengaging part 4b of the positive clutch there are notches 19 and 20 which are provided opposite of one another and which extend radially and are used to receive rollers 21 which keep the drive part and the disengaging part at a small distance from one another. By means of springs (not shown) acting between the disengaging part 4b and the bearing ring 15 the disengaging part is permanently pressed against the drive part 4a. The spring force, the diameter of the rolls 21 and the form of notches 19 and 20 determine the torque threshold beyond which the drive part 4a and the disengaging part 4b begin to rotate against one another, whereby the disengaging part 4b moves away from the drive part 4a and bolts 14 move deeper into bearing ring 15 (see also FIGS. 3 and 4). To observe the disengaging movement of the positive clutch, a sensor 22, in particular a light barrier or the like, is provided. Said sensor is sensitive to the relative movement of the disengaging part 4b towards the drive part 4a and transmits thereafter a signal to brake 3 via a very rapid electric connection, which brake is thus initiated.

Figure 6:
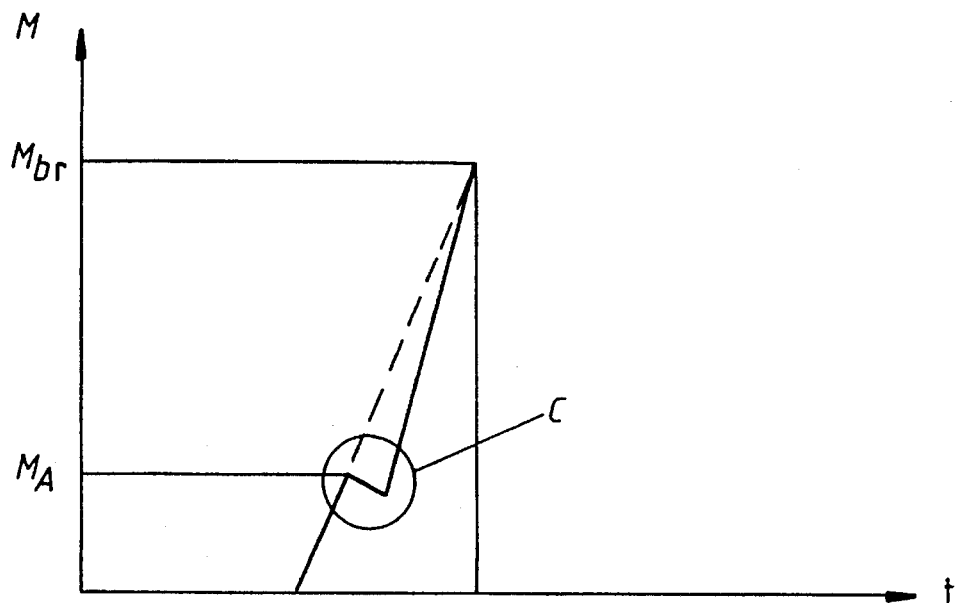
FIG. 6 shows torque-time characteristics of an intentionally initiated braking process.

In a properly working machine, motor 2 drives the drive shaft 1 and, with said shaft, the drive part 4a of the positive clutch which is engaged and entrains the toothed wheel 5. If the brake-clutch combination 3 is initiated without an overload occurring in the drive unit, either intendedly or by a sensor which notices that a workpiece in the processing area of a driven tool is not positioned correctly, the drive shaft 1 plus all masses still connected therewith, with the motor 2 being decoupled, are braked. This includes the connections from the positive clutch 4 over to the tool, thus also including the drive part 4a of the positive clutch and the inner ring 6b of the freewheel clutch 6. The torque acting on the brake 3 and the positive clutch 4 rises rapidly until torque threshold $M_A$ is reached at which point the positive clutch 4 disengages (see FIG. 6). During the disengaging movement there is a temporary decline in the torque acting on brake 3 (area C in FIG. 6) because the masses in the drive line behind the positive clutch 4 are decoupled by the brake 3 and the drive shaft comes to a standstill. During the disengaging movement the clutch rollers 21 move out of notches 19, whereby the disengaging part 4b turns with respect to the drive part 4a (direction of movement Y in accordance with FIG. 4). At the same time the clamping movement of the freewheel 6 begins, because the disengaging part 4b and the inner ring 6b are no longer driven by drive shaft 1 and drive shaft 1 comes to a standstill. Now toothed wheel 8 and driven shaft 9 via toothed belt 7 and the toothed wheel 5 drive the outer ring 6a of the freewheel 6 with their momentum until the freewheel blocks, or brakes the momentum instantaneously and thus receives the occurring braking moment which rises steeply until the final value $M_{br}$ and thus rapidly stops the rotational movement of toothed wheel 5 and the movement of all machine parts driven thereafter, because the freewheel 6 is held by the brake 3 which has come to a standstill in the meantime.

Figure 2:
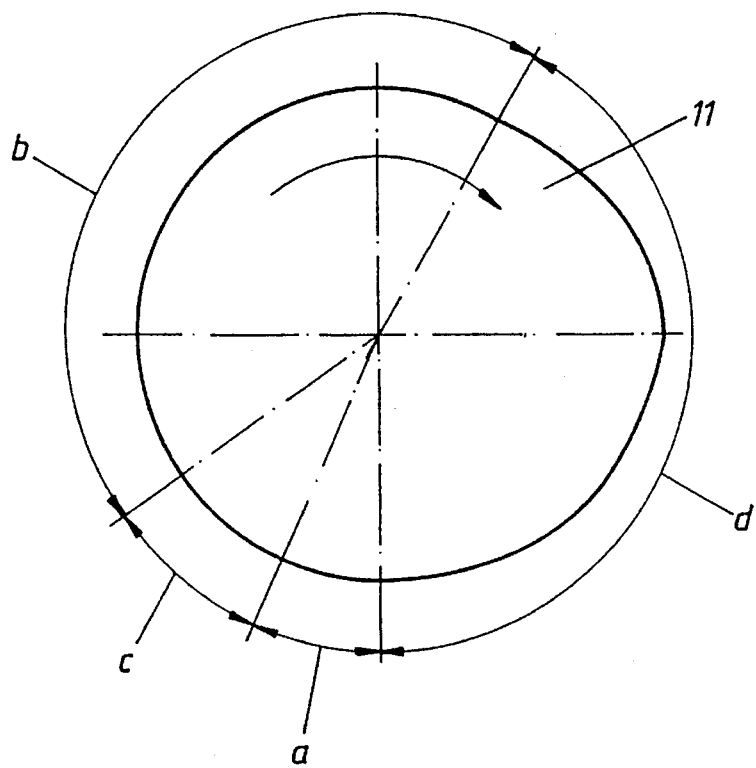
FIG. 2 shows a side view of an eccentric disk of the drive unit shown in FIG. 1.

The setting of the positive clutch according to the required drive moments of the driven machine parts (tools) has no influence on the disengaging behaviour of the positive clutch and thus on the maximum clamping angle of the freewheel. The already very small clamping angle of the freewheel 6 is reduced even further according to the reduction ratio of the toothed belt gear. This leads to a very small brake angle (a) in eccentric disk 11 (see FIG. 2). As nearly half of the circumferential angle of the eccentric disk is needed for the tool movement (section d) and approx. the same circumferential section B is required for the advancement or the insertion of the workpiece, there remains only a relatively small circumferential section (c) for fixing the tool and for control measurements of its position and also only a very small circumferential section (a) for the braking process which has to be initiated in the event of an established incorrect positioning. As the extension of the brake time finds entrance into the cycle time D (time used for one rotation of the eccentric disk 11) with a factor of 2, it is preferable that by using the invention the circumferential section (a) required for the braking is kept very small.

Figure 7:
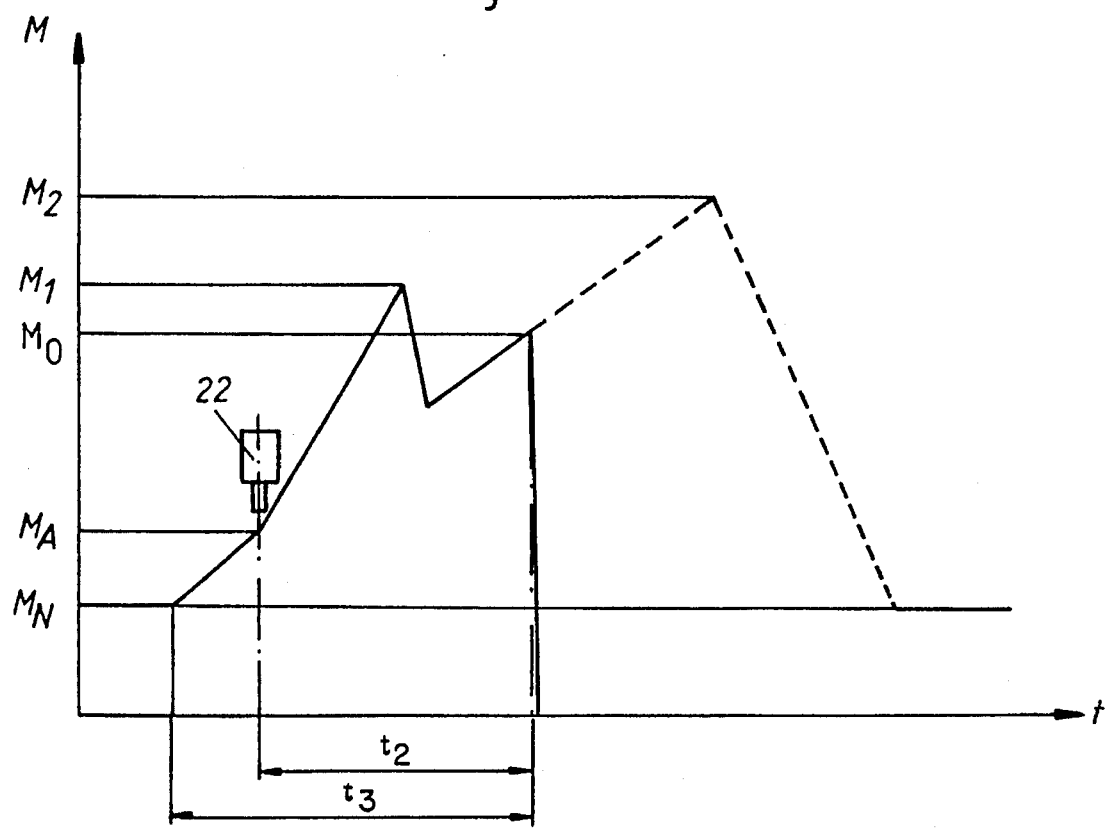
FIG. 7 shows torque-time characteristics in the event of an overload.

If an overload occurs in the driven machine part such as, for example, in a tool which might require braking and which is driven by the eccentric disks 11, freewheel 6 remains unlocked at first behind in the freewheel direction and the positive clutch can disengage towards the drive direction Z, whereby the disengaging movement commences after reaching the torque threshold $M_A$ (FIG. 7). The arising torque maximum $M_1$ is released by positive clutch 4 and the disengaging movement of the positive clutch 4 ends after reaching the torque maximum $M_1$. As the positive clutch is disposed far behind brake 3 in the drive line, $M_1$ is relatively small, so that the position of damage in the tool is subjected to a relatively small load. The brake device 3 is situated at the position of the smallest reduced mass moment of inertia.

The disengagement of the positive clutch 4 leads to the release of the gear members 5, 7, 8, 9, 11 which are operatively downstream of the positive clutch and their collective kinetic energy still needs to be dissipated. For this purpose a sensor 22 is provided which initiates the brake-clutch combination 3 at the beginning of the disengaging process during the lift-off of disengaging part 4b.

During the disengagement of the positive clutch the brake device only has to brake very small mass moments of inertia, i.e., those of the drive shaft 1, the drive part 4a of the positive clutch and the inner ring 6b of the freewheel. The remaining mass moments of inertia of the toothed belt transmission 5, 7, 8 and the cam gear 9, 11, which are situated in the drive line behind the outer ring 6a of the freewheel, are slightly delayed and, after the drive shaft i has come to a standstill, received by freewheel 6 as soon as its rotation is blocked. Within a extremely short brake time t2 after the response of the sensor 22 the stopping of the drive shaft 1 occurs and thereafter the blocking of the freewheel 6 leads to the standstill of the tool. This leads to the fact that the torque maximum $M_2$, which would come about due to the energy of rotation of the gear members following freewheel 6 without the engagement of the braking device and which would lead to damage in the tool, is limited to an uncritical maximum $M_0$ and its action time $t_3$ at the position of damage in the tool is shortened. After time $t_3$ the tool comes to a standstill.

Between the module 3 consisting of clutch and brake and the positive clutch 4 there may be provided a gear which reduces the mass moment of inertia to be braked. This, however, requires that a higher speed of the motor has to be accepted.

I claim:

1. A torque overload and braking arrangement for stopping a machine driven tool in one of a stamping and bending machine, said tool indirectly driven by an eccentric disk attached to a driven shaft, said driven shaft connected by a belt to a drive motor having a drive shaft, said torque and braking arrangement comprising:

a linear combination of a brake device, a torque overload clutch, and a freewheel, each of which is mounted on said drive shaft of said motor, and a sensor capable of activating said brake device, said torque overload clutch interposed between said brake device and said freewheel, and comprised of a positive clutch which disengages said drive shaft from said motor after a torque threshold is exceeded, said overload clutch comprised of a first and driving part attached to and non-rotatable with respect to the drive shaft and a second and disengaging part rotatably arranged on said drive shaft, said sensor responsive to an overload of torque on said clutch by detecting a relative separating movement between said drive part and said disengaging part, wherein said sensor activates said brake device to stop rotation of said drive motor and to hold said drive shaft from rotating, and wherein said freewheel has an outer ring, an inner ring, and pawls therebetween, said outer ring torsionally and rigidly connected to said disengaging part and said inner ring torsionally and rigidly connected to said drive shaft, said pawls operating freely in a driving direction of said motor, such that when said overload clutch disengages, said pawls of said freewheel engage said inner ring thereof to block rotation of said driven shaft, said freewheel being held by said brake device.

2. The device as claimed in claim 1, wherein the drive motor is an electric servomotor which said servomotor also serves as the braking means.

3. The device as claimed in claim 1, further including a combination of brake and clutch means disposed between the motor and the overload clutch.

4. The device as claimed in claim 1, wherein the drive part and the disengaging part of the overload clutch are biased against each other by a spring having variable spring rate characteristics.

5. Device as claimed in claim 1, characterized in that the braking device (3) in the drive line is arranged at a position of the smallest reduced mass moment of inertia.

* * * * *